United States Patent [19]

Bertelsbeck

[11] 4,223,756

[45] Sep. 23, 1980

[54] TRAFFIC SYSTEM WITH AUTOMATICALLY TRANSVERSELY CONTROLLABLE VEHICLES, ESPECIALLY FOR THE LOCAL PUBLIC PASSENGER TRAFFIC

[75] Inventor: Helmut Bertelsbeck, Stuttgart, Fed. Rep. of Germany

[73] Assignee: Daimler-Benz Aktiengesellschaft, Fed. Rep. of Germany

[21] Appl. No.: 940,768

[22] Filed: Sep. 8, 1978

[30] Foreign Application Priority Data

Sep. 9, 1977 [DE] Fed. Rep. of Germany ....... 2740576

[51] Int. Cl.$^3$ .............................................. B62D 1/24
[52] U.S. Cl. .................................... 180/169; 104/242; 180/79; 180/280; 340/61
[58] Field of Search ................. 180/169, 168, 131, 79, 180/280, 274, 276, 277; 340/61; 104/244.1, 242, 247, 130

[56] References Cited

U.S. PATENT DOCUMENTS

| | | | |
|---|---|---|---|
| 2,042,265 | 5/1936 | Main | 104/247 |
| 2,468,158 | 4/1949 | Bartholomew | 104/242 |
| 2,992,692 | 7/1961 | Chausson | 180/79 |
| 4,069,888 | 1/1978 | Wolters et al. | 180/169 |
| 4,103,284 | 7/1978 | Blake | 340/61 |

FOREIGN PATENT DOCUMENTS

| | | | |
|---|---|---|---|
| 2740576 | 3/1979 | Fed. Rep. of Germany | 180/131 |
| 47936 | 1/1964 | Poland | 180/131 |
| 1331678 | 9/1973 | United Kingdom | 180/131 |

*Primary Examiner*—David M. Mitchell
*Attorney, Agent, or Firm*—Craig & Antonelli

[57] ABSTRACT

A traffic system consisting of vehicle and road, in particular for the public local passenger traffic, with automatically cross-controllable vehicles, with a track-determining guide device extending along a desired track and with a cross-positional controller in the vehicle detecting the course of the guide device and acting on the steerable wheels of the vehicle; for purposes of catching a vehicle that deviates from the track, an emergency safety channel delimited by vertical side webs is provided along the road between the support wheels of the vehicle, whose width corresponds to the maximum permissive cross-positional tolerance of the vehicle on the road without lateral collision; at least one emergency safety bolt which is normally taken along in the raised position and is adapted to be rapidly lowerable, is provided centrally of the vehicle at the bottom side thereof; the safety bolt is able to support itself at the side webs of the emergency safety channel while feelers provided at the vehicle on both sides thereof cooperate with a triggering installation which responds in case of an external collision of a feeler and fires the emergency safety bolt into the emergency safety channel thereby to catch the vehicle.

21 Claims, 6 Drawing Figures

TRAFFIC SYSTEM WITH AUTOMATICALLY TRANSVERSELY CONTROLLABLE VEHICLES, ESPECIALLY FOR THE LOCAL PUBLIC PASSENGER TRAFFIC

The present invention relates to a traffic system consisting of vehicle and roadway, especially for the public local passenger traffic, with automatically transversely controllable vehicles, with a track-determining guide device on the road and with a cross-positional controller arranged on the vehicle, detecting the course of the guide device and acting on the steerable wheels of the vehicle.

With such vehicles track-guided in their transverse position by a controller, there exists the danger that some element in the cross-positional track guidance system fails or that by reason of a slippery road, the lateral guide forces of the wheels are temporarily absent. In such an emergency situation, the vehicle may suddenly break-out of the predetermined track. Consequently, measures have to be taken in order to prevent such a breaking-out.

It would be possible to arrange curb-like lateral guide webs laterally adjacent the support wheels of the vehicle, against which a vehicle deviating from its track could abut with its wheels and thus forcibly could be kept mechanically in its track. However, such catching installations could not carry out their function without consequence; one would have to reckon with considerable scratches at the wheels or body. Especially in case of longer tunnel stretches or other longer partial distances constricted by lateral boundaries, the vehicle would have to be steered manually over a relatively long distance in case of a failure of the cross-positional control. With lateral guide planks or lateral guide webs engaging at the tires, one would thereby have to reckon with a frequent side collision and with correspondingly frequent vehicle damages.

It is the aim of the present invention to provide an emergency safety or catching system for vehicles track-guided by cross-positional controllers, which also permits a manual steering without damaging lateral collisions and which remains in its expenditures within still acceptable limits.

The underlying problems are solved according to the present invention in that for purposes of catching track-deviating vehicles, an emergency safety groove or channel limited by vertical side webs is arranged along the track intermediate the support wheels of the vehicle at least within the area of those track sections that are laterally delimited at least on one side by a lateral boundary, whose width corresponds to the maximum permissive cross-positional tolerance of the vehicle under avoidance of lateral collisions, in that an emergency safety bolt normally taken along in its raised position and adapted to be rapidly lowered under the effect of a working storage device, is arranged approximately centrally in the vehicle on the bottom side thereof, which is able to support itself at the lateral webs, and in that detecting elements are provided at the vehicle extending on both sides beyond the driving profile of the vehicle, which are operatively connected with a triggering device for the working storage device of the emergency safety bolt, whereby the triggering installation responds in case of an external collision of a detection element and fires the emergency safety bolt into the emergency safety groove by means of the working storage device. The track deviation of a vehicle is thus determined by lateral collision of feelers at the lateral boundary. In such a case, an emergency safety or catching bolt is fired downwardly into an emergency safety channel of rectangular cross section which is embedded in the road. The emergency safety bolt and the lateral flanks of the emergency safety channel effect a mechanical positive guidance of the vehicle within the width dimension of the emergency safety channel. Lateral collisions of the vehicle with the lateral boundary are thereby avoided with certainty. The vehicle with continuous or occasional contact of the emergency safety bolt at the flanks of the emergency safety channel can then be driven manually with an acceptable driving speed out of the road section in question to a service station. The traffic is thereby as good as not impaired at all. Vehicle damages can be completely avoided.

The emergency safety bolt may be secured rigidly in the cross direction at the vehicle or it may be arranged movably in such a manner that it acts on the position of the steerable wheels of the vehicle. Small antenna-like feelers may be provided as detecting devices or the outside mirrors may also take over the detection function in that they are connected with a corresponding trigger switch. A prestressed spring or a chargeable working piston may serve as working storage device for the firing of the emergency safety bolt. A small explosive charge ignitable by means of an electric contact may also serve for the purpose of charging the working piston.

Accordingly, it is an object of the present invention to provide a traffic system with automatically cross-controllable vehicles, especially for public local passenger traffic, which avoids by simple means the aforementioned shortcomings and drawbacks encountered in the prior art.

Another object of the present invention resides in a traffic system including automatically cross-controlled vehicles which is provided with emergency devices to prevent the vehicle from breaking-out of its track in case of a failure of a part of the track-guidance system or in case of slippery road conditions.

A further object of the present invention resides in a traffic system with automatically cross-controllable vehicles which greatly increases the safety to traffic and especially to the vehicles as well as to the passengers thereof.

Still another object of the present invention resides in a traffic system with automatically cross-controllable vehicles equipped with a safety catching system that precludes damages to the body or tire of the vehicle.

Another object of the present invention resides in a traffic system with automatically cross-controlled vehicles which precludes frequent lateral collisions in case of failure of the cross-control system and thus also precludes damages to the vehicle as a result thereof.

A further object of the present invention resides in an emergency safety system for vehicles track-guided by cross-positional controllers which permits a manual steering of the vehicle without damaging lateral collisions thereof.

Still a further object of the present invention resides in a traffic system of the type described above which greatly increases the safety within acceptable limits of costs and expenditures involved therewith.

These and other objects, features and advantages of the present invention will become more apparent from the following description when taken in connection with the accompanying drawing which shows, for purposes of illustration only, several embodiments in accordance with the present invention, and wherein.

Figure 4:
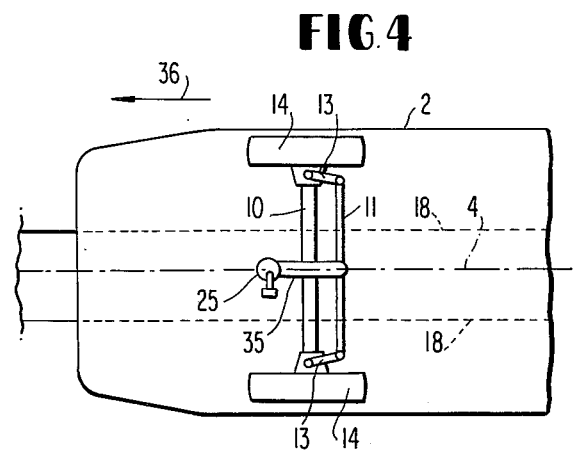
Figure 5:
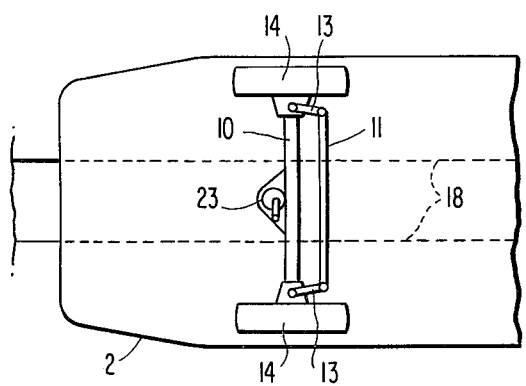
Figure 6:
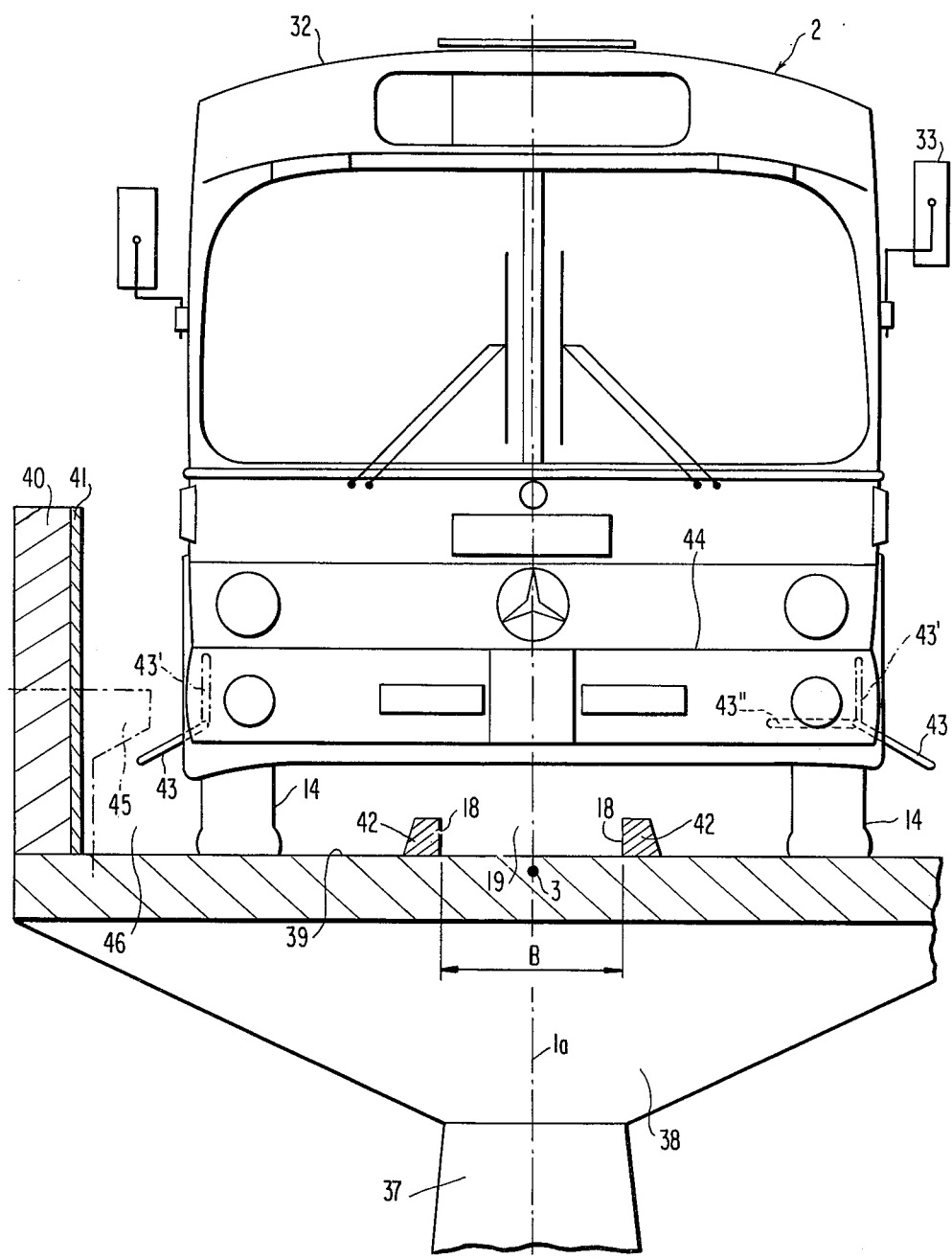

FIGS. 4 and 5 are partial schematic plan views on two further embodiments for the arrangement of the emergency safety bolt according to the present invention at the front axle of the vehicle; and FIG. 6 is a somewhat schematic front elevational view, partly in cross section, of a bus driven on an elevated line and equipped with an arrangement of the feelers in accordance with the present invention suitable therefor.

Figure 1:
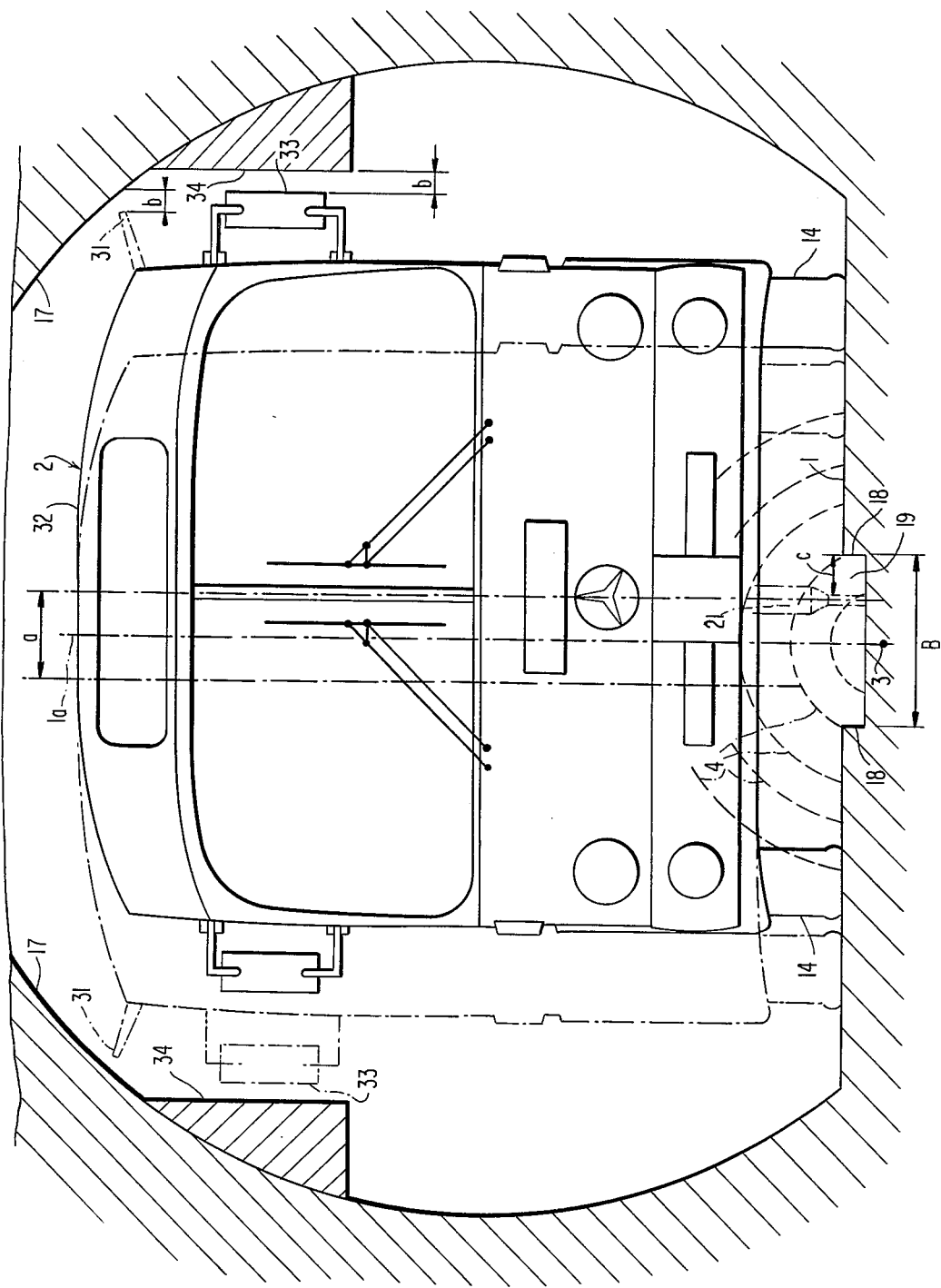
FIG. 1 is a somewhat schematic front elevational view of a cross-positionally controlled bus driving through a tunnel and equipped with an emergency safety installation according to the present invention.
Figure 2:
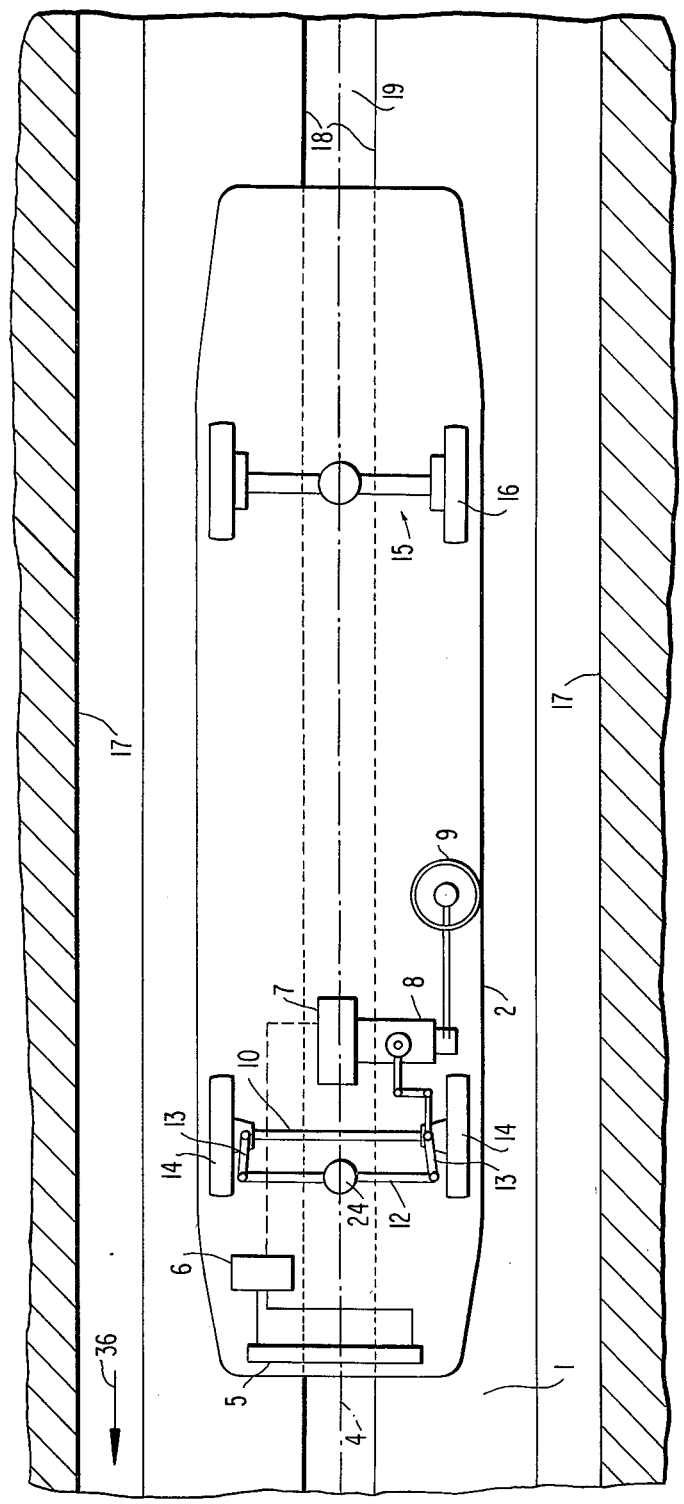
FIG. 2 is a schematic plan view on the vehicle according to FIG. 1.

Referring now to the drawing wherein like reference numerals are used throughout the various views to designate like parts, a track-guided vehicle generally designated by reference numeral 2 is illustrated in FIGS. 1 and 2 which is driven on a road 1 passing through a tunnel. A guide cable 3 is embedded in the ground of the road within the road center indicated by a dash and dotted line 1a, from which are transmitted electromagnetic waves 4. A sensor 5 responding to these electromagnetic waves is arranged in the vehicle which is operatively connected with its output to a cross-positional controller 6; the latter is again connected with a servo-device 7, from which a servo-steering gear 8 for influencing the wheel deflection of the steerable wheels 14 is adapted to be controlled. The servo-steering gear 8 may also be actuated directly by the steering wheel 9 (FIG. 2). The arrangement for the automatic track guidance is now so constructed that with an excitation maximum located eccentrically at the sensor 5, the steering wheels 14 are deflected out of the straight driving direction in the same direction in which direction the excitation maximum is disposed off-center. As a result thereof, a vehicle which drives off-center, is again returned to the road center. As a result thereof, an automatic cross-positional control of the vehicle on the road is realized during the drive. In lieu of the contactlessly operating cross-positional control, a track detection by means of a narrow groove embedded in the road and of a detection lever engaging into the same is also feasible within the scope of the present invention.

In case of failure of a part partaking in the cross-positional control, there exists the possibility that the vehicle deviates from its track in an uncontrollable manner and collides with lateral boundaries, for example, with the tunnel wall 17 or causes or suffers damages in some other manner. For catching the vehicle within a tolerable width, an emergency safety or catching bolt 21 adapted to be fired downwardly, is provided at the bottom side of the vehicle and an emergency safety groove or channel 19 with vertical side webs 18 and with a width B is provided in the road. The side webs 18 of the emergency safety groove or channel 19 may be formed by iron or steel profiles. The lower end of the emergency safety bolt 21 which cooperates with the lateral webs 18 may be constructed as small roller or as fixed bolt having a large wear resistance.

Figure 3:
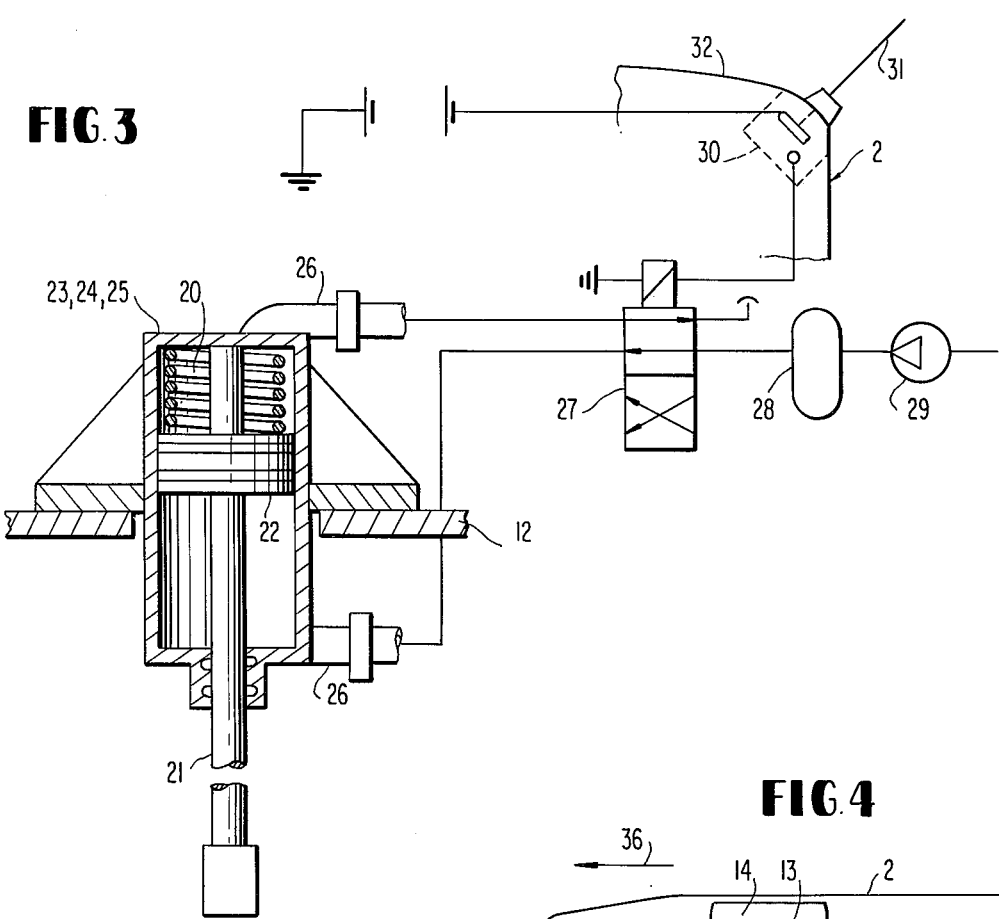
FIG. 3 is a schematic view illustrating the operation of a triggering installation for the emergency safety bolt in accordance with the present invention.

In the illustrated embodiments, the emergency safety bolt is constructed as a piston rod 21 of a pneumatic actuating device formed by the cylinder 23, 24, 25 and by the piston 22 (FIG. 3). This actuating device may be arranged at different places of the front vehicle axle. In the embodiment according to FIG. 2, it is arranged at the tie-bar or track-rod 12 which, for this purpose, is arranged exceptionally in front of the axle body 10 of the front axle. The track rod or tie bar 12—in the embodiment according to FIG. 2 the tie bar 12 and in the embodiment according to FIGS. 4 and 5 the tie bar 11—connects the two steering arms 13 of the oppositely disposed deflectable or steerable wheels 14. A compression spring 20 is arranged on the top side of the piston 22. Normally, a high air-pressure exists at the bottom side of the piston 22, which retains the piston in the raised illustrated position against the force of the stressed spring. The air-pressure is fed to the cylinder from the pressure storage device 28 by way of the working connections 26 and by way of the magnetically controllable shifting valve 27 having a large opening cross section, which pressure storage device is held at a suitable pressure by the compressor 29. The electromagnet actuating the valve 27 is adapted to be connected by way of the triggering switch 30 with the power supply of the vehicle and is energizable thereby. After the closing of the triggering switch 30, the valve 27 shifts over and the lower piston side is vented while compressed air is fed to the upper piston side. As a result thereof, the piston 22 moves practically instantaneously in the downward direction by reason of the now released spring force and by reason of the additional compressed air. By returning the triggering switch 30 per remote control from the driver into the illustrated starting position, for example, at the end of a laterally delimited road section, in which a failure occurred, the bottom side of the piston 22 can again be acted upon with pressure. Appropriately, a disconnection of the cross-positional controller 6 is coupled with the triggering switch 30 so that in such emergency situations two types of steering influences cannot superimpose one on the other.

The triggering switch 30 may be coupled according to the illustrated embodiment of FIG. 3 with an antenna-like feeler pin 31 laterally on the roof 32 of the vehicle 2. In lieu of this arrangement of the triggering switch 30, also a combination of the switch with the outside mirrors 33 of the vehicle would be feasible. With this arrangement which is appropriate above all with vertical side boundaries, an additional abutment surface 34 would have to be arranged in the tunnel having inclined side walls 17. The operation of the entire arrangement is now briefly as follows:

The normal cross-positional control of the vehicle responds within a control range a delimited by two dash and dotted lines. In FIG. 1, the vehicle is illustrated in full lines in the right extreme position of the control range; the left extreme position of the vehicle is indicated by dash and dotted lines. The distance of the outermost ends of the feelers—be it the antenna-like feeler pin 31 or the outside mirror 33—from the associated abutment surface 17, respectively, 34, amounts in the illustrated end positions of the control range to a certain safety distance b. If by reason of a track deviation of the vehicle, this safety distance b is also exceeded, then it will lead to a side collision of the feeler and correspondingly to a response of the trigger switch 30. As a result thereof, the emergency bolt 21 is instantaneously fired downward into the emergency safety groove or channel 19. The width B of the emergency safety groove or channel 19 is larger than the distance a+2b—the distance c is larger than the safety distance b. The width of the emergency safety groove or channel 19 results from a+2c. This width of the emergency safety channel which is selected slightly larger compared to the control range plus twice the safety distance, results from a certain delay between response of the triggering switch 30 and the instant until the emergency safety bolt 21 is lowered into the emergency safety channel 19. With a lowered emergency safety bolt, a further lateral deviation of the vehicle is no longer possible because the emergency safety bolt abuts at the lateral web 18 of the channel 19 and the vehicle is thereby caught mechanically and damage-free. A manual steering of the vehicle is now possible within a width tolerance which is determined by the width of the emergency safety channel 19, whereby a lateral collision of the emergency safety bolt at the side webs 18 can be readily accepted.

In the embodiment according to FIG. 2, the emergency safety bolt supported in the cylinder 24 is secured at the vehicle movably in the cross direction and more particularly—as mentioned—it is arranged at the track rod or tie-bar 12 disposed in front of the axle. As a result thereof, in case of a lateral contact of the emergency safety bolt with a side web 18, the steerable wheels 14 are again steered toward the road center, and the cross-positional deviation of the vehicle is again automatically reduced. In the embodiment according to FIG. 4, the tie-bar 11 is arranged in the customary manner to the rear of the axle body 10 of the front vehicle axle, as viewed in the driving direction 36. Instead, a guide lever 35 is provided which is pivotally connected with the axle body 10 and with the tie-bar 11 and which extends forwardly in the driving direction 36. In this embodiment, the working cylinder 25 carrying the emergency safety bolt 21 is arranged at the forward end of the guide lever 35. Also with this arrangement of the emergency safety bolt, movable in the cross direction, an automatic steering back of the vehicle to the road center is brought about by lateral contact of the emergency safety bolt with the lateral web 18. In the embodiment according to FIG. 5, the working cylinder 23, in which the emergency safety bolt 21 is arranged, is rigidly connected with the axle body 10. This rigid arrangement requires a sturdy construction since, under certain circumstances, the direction of the front wheels 14 may deviate from the direction of the lateral web 18 and very high lateral guide forces have to be applied.

It is also feasible within the scope of the present invention to arrange according to the illustrated embodiment an emergency safety or catching bolt, not only at the front axle, but also at the rear axle 15, which in case of emergency, retains the rear wheels 16 on track within the width tolerance b.

The embodiment according to FIG. 6 illustrates the arrangement of side feelers with the use of cross-controlled vehicles on elevated lines. With the same, a road 39 is mounted on pylons 37 and cross bearers 38. Side walls 40 are arranged along the sides of the elevated road which are provided with a sound-absorbing cover layer 41. The side walls 40 serve in addition to a sound protection, also for the improvement of the statics of the elevated road and may offer also a certain skid protection for the vehicle in case of emergency. As to the rest, they serve as guard rails for persons occasionally passing on foot over the elevated road (emergency path for passengers, service personnel). The emergency safety channel 19 with its vertical side webs 18 may also be formed by ribs 42 mounted on the surface of the road 39. The ribs 42 may be made of profile steel or of concrete.

In order to be able to trigger the emergency safety or catching installation according to the present invention in good time also when driving on elevated lines, feelers 43 are provided in the embodiment illustrated in FIG. 6 within the lower lateral area of the vehicle body. Sufficient space for the accommodation of the feelers 43 exists in the space to the rear of the bumper 44 of the vehicle. Since the feelers, with this height arrangement, are accessible to road pedestrians during the normal road drive of the vehicle, the feelers have to be folded back during transition onto a trackless road-drive into an ineffectual position on the inside of the vehicle body (position 43'). Another possibility would be to fold the feeler 43 inwardly into a horizontal position (position 43''). The height position and inclination of the feeler 43 has to be made in such a manner that the feeler within the area of station platforms 45 are still disposed below the platform and extends into a free space which is overhung by the platform. As a result thereof, the feeler is removed within the station area from an intentional contact by waiting or boarding and leaving passengers.

The actuating mechanism for pivoting the feeler is appropriately coupled to a positional feedback which is indicated within the field of vision of the driver of the vehicle and which, on the other hand, is coupled with the cross-positional controller as input signal. With an engaged cross-positional controller, the feelers automatically fold outwardly; with a turned-off cross-positional controller they pivot inwardly. Upon response of the trigger switch for the emergency catching installation connected with the feelers, the cross-positional control is also simultaneously turned off or rendered inoperable in order not to obtain two different steering influences during a possible renewed response of the cross-positional control.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A traffic system, which comprises automatically, transversely controllable vehicles, track-determining guide means extending along a desired track on the road, and cross-positional control means on the vehicle which detect the course of the guide means and act on steerable wheels of the vehicle, characterized in that for purposes of catching a track-deviating vehicle, an emergency safety channel means delimited by substantially vertical lateral web means is arranged along the road between supporting wheels of the vehicle at least within the area of such road sections as are delimited at least on one side thereof by lateral boundary means, the width of said emergency safety channel means corresponding to the maximum permissive cross-positional tolerance of the vehicle on the road under avoidance of lateral collisions, in that at least one emergency safety bolt means normally taken along in the raised position and operable to be rapidly lowered under the effect of a storage means is arranged approximately centrally in the vehicle at the bottom side thereof, which is operable to support itself at the lateral web means, and in that feeler means are provided on the vehicle which extend on both sides beyond the driving profile of the vehicle and which are operatively connected with a triggering means for the storage means, said triggering means responding during an external collision of a feeler means and being operable to fire the bolt means into the emergency safety channel means by means of the storage means.

2. A traffic system according to claim 1, characterized in that the traffic system is for the public local passenger traffic.

3. A traffic system according to claim 1, characterized in that the lateral boundary means are formed by one of boundary walls, supports, masts and trees.

4. A traffic system according to claim 1, characterized in that said road sections include one of tunnel, passage and bridges.

5. A traffic system according to claim 1, characterized in that the emergency safety bolt means is rigidly guided in the cross section.

6. A traffic system according to claim 1, characterized in that the emergency safety bolt means is movably guided in the cross direction and acts on the position of the steerable wheels of the vehicle.

7. A traffic system according to claim 1, characterized in that the feeler means are mounted on the roof of the vehicle extending obliquely upwardly.

8. A traffic system according to claim 7, characterized in that the feeler means are provided on the roof of buses extending from the lateral edge thereof obliquely upwardly.

9. A traffic system according to claim 1, characterized in that outside mirror means of the vehicle serve as feeler means and are operatively connected with the triggering means.

10. A traffic system according to claim 1, characterized in that the storage means includes a prestressed spring.

11. A traffic system according to claim 1, characterized in that the storage means include a pneumatic or hydropneumatic actuating device.

12. A traffic system according to claim 11, characterized in that the actuating device includes a pressure storage device.

13. A traffic system according to claim 11, characterized in that the actuating device includes an explosive charge.

14. A traffic system according to claim 6, characterized in that the emergency safety bolt means is rigidly arranged at a tie-bar kinematically coupling two steerable wheels of an axle, and in that the tie-bar is arranged in front of the axle center of the corresponding vehicle axle, as viewed in the driving direction.

15. A traffic system according to claim 6, characterized in that a tie bar kinematically coupling two steerable wheels of a vehicle axle is arranged to the rear of the axle center of the corresponding vehicle axle, as viewed in the driving direction, and in that the emergency safety bolt means is arranged at the forward end of a lever pointing in the driving direction and pivotally connected to an axle bearer and the tie-bar.

16. A traffic system according to claim 1, characterized in that the lateral web means are mounted at the level of the road surface, with which the vehicle wheels come in contact.

17. A traffic system according to claim 1, characterized in that the feeler means are secured within the lower area laterally at the vehicle body.

18. A traffic system according to claim 17, characterized in that the feeler means are adapted to be folded-in underneath the body surface of the vehicle.

19. A traffic system according to claim 17 or 18, characterized in that station platform means project with a spacing over the feeler means.

20. A traffic system according to claim 18, characterized in that the position of the feeler means are indicated at the driver position.

21. A traffic system according to claim 20, characterized in that a signal corresponding to the position of the feeler means is also fed to the cross-positional control means.

* * * * *